2,977,240
IMPROVING THE LIGHT REFLECTANCE OF EXPANDED PERLITE MATERIAL

Harry H. Houston, Elmhurst, Ill., assignor to International Minerals & Chemical Corporation, a corporation of New York No Drawing. Filed Oct. 19, 1956, Ser. No. 616,928

8 Claims. (Cl. 106—300)

This invention relates to a method of processing particulate material. More particularly, it relates to an improved method of producing finely divided particles, suitable for use as a filter aid or as a filler, from perlite ore.

Crude or raw perlite ore is a volcanic glass having a silica content of about 65-70% by weight, together with about 12-16% alumina, 2-5% entrapped water, 7-10% alkali metal oxides and small amounts of oxides of iron, calcium and magnesium. A characteristic property of perlite and of similar volcanic glasses containing upwards of 2% water is that when such material is exposed in fine particle form to temperatures in the range of about 1500-2100° F., softening and rapid expansion or puffing of the particles takes place to produce a cellular expanded product having an extremely low density. Because of its low density, chemical inertness and heat resistance, fully expanded perlite has considerable value as a heat insulating material, and for other applications, such as an aggregate in plaster, concrete and the like.

Perlite particles expanded by conventional heating methods contain a plurality of sealed, sponge-like air cells or individual spheres, the particles thus being capable of floating indefinitely in liquids such as water. In such expanding methods, a minor amount of "fines," i.e., fractured, finely divided particles, are produced. It has been found that these fines are suited for use as a filter aid material, since they provide a great surface area, have a low bulk density, and a low wet density. Unlike the expanded "whole" particles, they do not float on water or other liquids. Many attempts have been made to increase the production of such finely divided material from expanded perlite by grinding and other comminuting operations.

Heretofore, perlite ore particles have been expanded and impacted against abrading surfaces to fracture the expanded particles and produce a product suitable for use as a filter aid, as described and claimed in copending patent application Serial No. 410,065, filed February 15, 1954, by Gindoff, McCollum and Polanco (issued on September 23, 1958 as U.S. Patent No. 2,853,241). The product has a large surface area, low bulk density, low wet density, and a substantial portion of the product will not float in aqueous fluids. The product gives flow rates that are entirely comparable with those of conventional diatomaceous earth filter aids. The product is white in color and has light reflecting properties which make it suitable for use as a filler in paper, paint and other products.

In my copending patent application, U.S. Serial No. 603,188, filed August 9, 1956, and now U.S. Patent No. 2,898,303, a method is described and claimed in which ground perlite ore may be treated with a dilute mineral acid solution prior to expansion to improve the filtration and light reflecting properties of the resulting comminuted perlite product.

It is a primary object of the instant invention to provide a new process of improving the light reflecting properties of the expanded perlite material.

It is another object of this invention to provide an improved process for the production of a perlite composition suitable for use as a filler for paint, paper, and the like.

It is still another object of this invention to provide an improved process for producing high quality finely divided material preferably utilizing as a raw material what has heretofore been considered as waste material from the grinding of perlite ores, i.e., ground perlite or of minus 30 mesh or less. These and other objects and advantages of this invention will be readily apparent from the following detailed description.

When a ground perlite ore is mixed with a white refractory oxygen-containing substance selected from the group consisting of titanium oxide, magnesium oxide, magnesium carbonate, zirconium oxide, and dicalcium phosphate, and the mixture is heated to temperatures in the range between about 1500° and about 2100° F., to cause expansion of the particles, the perlite composition which is recovered has improved light reflecting properties.

More in detail, ground perlite ore having a particle size of about minus 30 mesh or less may be utilized. Perlite ore of larger particle size may also be used if desired, but from the standpoint of economy and the obtaining of more uniform expansion, it is preferred to use perlite ore having a particle size of less than about 30 mesh. In one embodiment of the invention, ground perlite ore is screened or classified to separate coarse perlite aggregate and to recover fine perlite particles which are then mixed with the white refractory oxygen-containing substance, then expanded and comminuted.

In another embodiment of the invention, the fine perlite particles obtained from the screening step may be activated by pretreatment with a dilute aqueous solution of a mineral acid in the manner described in my copending patent application, U.S. Serial No. 603,188, filed August 9, 1956. Prior to mixing with a white refractory oxygen-containing substance and prior to expansion of the particles so treated, the perlite ore is treated in a suitable reactor with a dilute aqueous solution of a mineral acid such as sulfuric acid, hydrochloric acid, nitric acid, hydrofluoric acid, phosphoric acid, or fluosilicic acid under condtions described more fully hereinafter. For example, in a preferred embodiment of the activation procedure, perlite ore particles having a mesh size of about minus 45 mesh are contacted with a dilute aqueous solution of sulfuric acid. The acid solution is prepared by adding sufficient sulfuric acid to water to obtain a concentration of between about 0.25 and about 0.5 mol of sulfuric acid in 100 grams of acidic aqueous solution. The slurry is heated to a temperature between about 60° C. and about the boiling point for a period between about 1.5 and about 3 hours. After the reaction is terminated, the acid solution is decanted and the perlite solids are washed with an aqueous medium until substantially neutral. After the wash medium is decanted the acid activated perlite material is in condition to be mixed with the white refractory oxygen-containing substance.

Perlite material, either pretreated with acid or not, as the case may be, and a white refractory oxygen-containing substance are preferably mixed in the presence of an aqueous medium in order to promote the adherence of the refractory substance to the surfaces of the perlite material. The moisture content of the mixture should be between about 20% and about 35% by weight and preferably between about 30% and about 35% by weight during the mixing step. When the perlite material is dry, it may be either moistened with an aqueous medium prior to mixing with the refractory substance or blended with a slurry of the refractory substance in an aqueous medium. Perlite material which has been activated with a dilute aqueous solution of a mineral acid, washed to neutrality and decanted, usually contains sufficient moisture to permit adequate mixing with the refractory substance. Improved light reflectance of the product can be obtained when dry perlite material is mixed with dry refractory substance prior to expansion, but best results are obtained when moisture is present during the mixing operation.

The white refractory oxygen-containing substance which is added to the perlite material is selected from the group consisting of titanium oxide, magnesium oxide, magnesium carbonate, zirconium oxide, and dicalcium phosphate. Although it has been found that the addition of dicalcium phosphate to ground perlite material prior to expansion will improve the light reflecting properties of the expanded material, less improvement of these properties is obtained using this compound than is obtained using an equivalent amount by weight of any of the other refractory compounds in the group.

Weight ratios of perlite material (no a dry basis) to the white refractory oxygen-containing substance should be between about 5 parts and about 200 parts of perlite material per part of refractory substance. Preferably, the mixture has a weight ratio between about 15 and about 50 parts of perlite per part of refractory substance. When the weight ratio is less than about 5:1, the refractory substance tends to fuse on the surface of the perlite material during the expansion step to such a degree that expansion of the perlite material is inhibited. When the weight ratio is greater than about 200:1, there is not sufficient refractory substance present to make a substantial improvement in the light reflecting properties of the expanded perlite product.

Particle size of the white refractory oxygen-containing substance should be less than about 100 mesh and preferably less than about 200 mesh in order to obtain maximum distribution of the substance on the surfaces of the perlite particles. Perlite material and the white refractory oxygen-containing substance are mixed in the presence of an aqueous medium as described above, until a substantially homogeneous mixture is obtained. The mixing may be carried out in a plug mill, ribbon blender, or other suitable mixing or blending equipment. The homogeneous mixture obtained by this operation may be dried at a temperature between about 100° C. and about 140° C. to remove excess moisture prior to expansion. After expansion or exfoliation of the treated ore, the particles are found to possess increased light reflecting properties, which are further increased if the expanded particles are subjected additionally to an abrading or comminution process to break up the spheres formed in the expansion step. Abrading or comminution is preferably carried out while the expanded particles are at or near the temperature maintained in the expansion or popping step. Abrading the product in a ball mill or other suitable comminuting equipment to reduce the particle size to less than about 200 mesh is also used, if convenient, but hot freshly expanded particles striking abrading surfaces at high velocities is the preferred method of comminuting the exfoliated particles.

The light reflectance of the perlite product was measured in a Beckman quartz spectrophotometer, Model DU, non-recording type. The samples were compared to a Vitrolite glass working standard, No. V6–B65, to determine the percent of light reflected by the sample. The working standard was calibrated by the National Bureau of Standards by comparison with the NBS Vitrolite reference standard No. V2–B4. The light reflectance of the reference standard was calibrated by comparison with the reflectance of freshly prepared MgO.

As illustrative of the character of the instant invention but in nowise intending to be limited thereby the following examples are described. All parts and solid-to-liquid ratios are by weight unless otherwise specified.

EXAMPLE I

Perlite ore mined in the vicinity of Fish Springs, California, was crushed to about $-3/16''$ mesh and dried at about 120° C. in a rotary dryer. The dryer product was screened at about 45 mesh. The +45 mesh was stored for use in preparing plaster aggregate. A sample of the −45 mesh ore was separated into portions A through F.

As a control, portion A was expanded at a temperature of between about 1500° F. and about 2100° F. by passing it through an inclined furnace in a direction concurrent to a natural gas flame. The light reflectance of the expanded product, as determined by a Beckman Model DU spectrophotometer, using a Vitrolite working standard No. V6–B65 was found to be about 81.0.

EXAMPLE II

Portion B of Example I was moistened with sufficient water to provide a solids to liquid ratio of about 70 to 30. Magnesium carbonate, having a mesh size less than about 200 mesh was added to the moistened perlite and mixed until substantially homogeneous. The magnesium carbonate was added in amount equivalent to about 5 parts $MgCO_3$ per 95 parts of perlite ore. The mixture was dried at about 110° C. for about 3 hours and fed into the inclined tube described in Example I. The temperature in the expansion zone was maintained between about 1500° F. and about 2100° F. The light reflectance of the expanded product, which was determined as in Example I, was found to be about 84.2.

EXAMPLES III AND IV

Portions C and D of Example I were each moistened with sufficient water to provide a solids to liquid ratio of about 70 to 30. Titanium oxide having a mesh size less than about 200 mesh was added to each portion of the moistened perlite and mixed until substantially homogeneous. Titanium oxide was added to portion C in an amount equivalent to about 15 parts $TiO_2$ per 85 parts of perlite ore, and to portion D in an amount equivalent to about 10 parts $TiO_2$ per 90 parts of perlite ore. The mixtures were separately dried at about 110° C. for about 3 hours and separately fed into the inclined tube described in Example I. The temperature in the expansion zone was maintained between about 1500° F. and about 2100° F. The light reflectance of the expanded products obtained from portions C and D, as determined in Example I, were about 84.5 and 84.5 respectively.

EXAMPLE V

Portion E of Example I was treated in the same manner as the perlite ore in Examples II to IV, except that the additive was magnesium oxide having a mesh size less than about 200 mesh. The magnesium oxide was added to Portion E in an amount equivalent to about 5 parts MgO per 95 parts of perlite ore. The light reflectance of the expanded perlite product was about 86.0.

EXAMPLE VI

A dilute aqueous solution of sulfuric acid was prepared by adding sufficient concentrated sulfuric acid to water to obtain a concentration of about 0.44 mol of sulfuric acid per 100 grams of dilute aqueous acid solution. Portion F was mixed with the dilute aqueous acid solution in an amount equivalent to about 4 parts of perlite per 6 parts of aqueous acid solution. The slurry was heated at the boiling point for about 2 hours, cooled, and the excess acid was decanted. The solids were washed with several portions of water until free of acid, and then dewatered. The moist solids, which still contained roughly 30% water, were separated into portions N through V.

As a control, portion N was dried at about 110° C. for about 3 hours and fed into the inclined furnace of Example I. The temperature in the expansion zone was maintained between about 1500° F. and about 2100° F. The light reflectance of the product, which was determined as in Example I, was found to be about 85.8.

EXAMPLES VII–IX

Portions O, P, and Q of Example VI were each mixed with magnesium carbonate in amounts equivalent to about 15 parts MgCO₃ per 85 parts of perlite material, about 7 parts MgCO₃ per 93 parts of perlite material, and about 5 parts MgCO₃ per 95 parts of perlite material, respectively. The magnesium carbonate had a mesh size less than about 200 mesh. Each mixture was blended until homogeneous and dried at about 110° C. for about 3 hours. Each mixture was expanded in the manner described in Example I. The relative light reflectance of each of the expanded products, which was obtained in the manner described in Example I, is shown in Table I.

*Table I*

| Example | Portion | Parts Perlite Material | Parts MgCO₃ | Light Reflectance |
|---|---|---|---|---|
| VII | O | 85 | 15 | 87.5 |
| VIII | P | 93 | 7 | 87.9 |
| IX | Q | 95 | 5 | 88.2 |

EXAMPLES X–XII

Portions R, S and T of Example VI were each mixed with titanium oxide in amounts equivalent to about 10 parts TiO₂ per 90 parts of perlite material, about 7 parts TiO₂ per 93 parts of perlite material and about 5 parts TiO₂ per 95 parts of perlite material, respectively. The titanium oxide had a mesh size less than about 200 mesh. Each mixture was blended until homogeneous and dried at about 110° C. for about 3 hours. Each mixture was expanded in the manner described in Example I. The light reflectance of each of the expanded products, which was obtained in the manner described in Example I, is shown in Table II.

*Table II*

| Example | Portion | Parts Perlite Material | Parts TiO₂ | Light Reflectance |
|---|---|---|---|---|
| X | R | 90 | 10 | 87.5 |
| XI | S | 93 | 7 | 89.0 |
| XII | T | 95 | 5 | 89.8 |

When the product obtained from portion T was ground in a ball mill until substantially less than about 200 mesh, the reflectance was found to be about 93.1.

EXAMPLE XIII

Portion U of Example VI was mixed with zirconium oxide in an amount equivalent to about 10 parts ZrO₂ per 90 parts of perlite material. The zirconium oxide had a mesh size less than about 200 mesh. The mixture was blended until homogeneous and dried at about 110° C. for about 3 hours. The mixture was expanded in the manner described in Example I. The light reflectance of the expanded product, which was obtained in the manner described in Example I was found to be about 89.3. A portion of the product was ground in a ball mill until substantially less than about 200 mesh. The reflectance of this material was found to be about 92.3.

EXAMPLE XIV

Portion V of Example VI was mixed with dicalcium phosphate having a mesh size less than about 200 in an amount equivalent to about 5 parts of CaHPO₄ per 95 parts of perlite material. The light reflectance of the expanded product was found to be about 88.1.

As used in this description and accompanying claims, the expression "perlite material" is intended to cover both perlite ore and acid treated perlite ore.

Having thus fully described and illustrated the invention, what is desired to be secured by Letters Patent is:

1. The process of preparing a perlite composition of improved light reflecting properties which comprises mixing ground unexpanded perlite material with a white refractory oxygen-containing substance selected from the group consisting of titanium oxide, magnesium oxide, magnesium carbonate, zirconium oxide, and dicalcium phosphate, and heating the mixture to temperatures in the range between about 1500° and about 2100° F. to cause expansion of the particles.

2. The process described in claim 1 in which expanded particles are comminuted.

3. The process described in claim 1 where the weight ratio of perlite material to white refractory oxygen-containing substance in the mixture is between about 5 to 1 and about 200 to 1.

4. The process described in claim 1 where the white refractory oxygen-containing substance has a particle size less than about 200 mesh.

5. The process described in claim 1 where the perlite material and the white refractory oxygen-containing substance are mixed in the presence of an aqueous medium in an amount equivalent to between about 20% and about 35% moisture by weight, and the mixture is dried at temperatures between about 100° C. and about 140° C. prior to heating to expansion temperature.

6. The process described in claim 1 where ground perlite material having a mesh size less than about 30 mesh is reacted with a dilute aqueous solution of a mineral acid and washed with an aqueous medium prior to heating to expansion temperatures.

7. The process of preparing a perlite composition of improved light reflecting properties which comprises reacting a ground unexpanded perlite ore having a mesh size less than about 30 mesh with a dilute aqueous solution of a mineral acid having a concentration between about 0.25 and about 0.5 mol of acid per 100 grams of acid solution at temperatures between about 60° C. and about the boiling point point for a period of between about 1.5 and about 3 hours, decanting the acid, washing the activated perlite material with an aqueous medium, decanting the aqueous medium, mixing the moist perlite material with a white refractory oxygen-containing substance selected from the group consisting of titanium oxide, magnesium oxide, magnesium carbonate, zirconium oxide, and dicalcium phosphate, drying the mixture at temperatures between about 100° C. and about 140° C., heating the mixture to temperatures in the range between about 1500° and about 2100° F. to cause expansion of the particles, and recovering the expanded particles.

8. In the process of expanding ground unexpanded perlite material at a temperature in the range between about 1500 and about 2100° F., the improvement which comprises mixing said perlite material with a white refractory oxygen-containing substance selected from the group consisting of titanium oxide, magnesium oxide, magnesium carbonate, zirconium oxide, and dicalcium phosphate prior to expansion, whereby the perlite composition produced in the expansion step has improved light reflecting properties.

References Cited in the file of this patent

UNITED STATES PATENTS

| | | |
|---|---|---|
| 1,898,830 | Guthrie et al. | Feb. 21, 1933 |
| 2,030,239 | Byers | Feb. 11, 1936 |
| 2,378,193 | Cummins et al. | June 12, 1945 |
| 2,388,060 | Hicks | Oct. 30, 1945 |
| 2,413,516 | Pratt et al. | Dec. 31, 1946 |
| 2,428,317 | Moran | Sept. 30, 1947 |
| 2,492,208 | Barnes | Dec. 27, 1949 |
| 2,524,601 | Riddle | Oct. 1, 1950 |